2,891,943

NOVEL ANTIBIOTICALLY ACTIVE PRODUCTS

Herbert Keller and Heinrich Mückter, Stolberg, Rhineland, Germany, assignors to Chemie Grunenthal G.m.b.H. Stolberg, Rhineland, Stolberg, Germany No Drawing. Application March 2, 1955
Serial No. 491,772

Claims priority, application Germany March 10, 1954

5 Claims. (Cl. 260—210)

The present invention relates to new antibiotically active products, which are chemical compounds of substances.

It is known that the basic antibiotics produced from species of Streptomyces have valuable antibiotic properties. Examples of such basic antibiotics produced from species of Streptomyces are streptomycin, dihydrostreptomycin, the neomycin produced from *Streptomyces fradiae* and the viomycin produced from *Streptomyces puniceus*. These antibiotics are used in medical practice as such, or in the form of salts or in the form of preparations containing them in association with other medicines. Unfortunately, these antibiotics produce in the human and animal body a series of secondary effects which greatly impede their practical use. Secondary effects which are particularly known are disturbances of the hearing and of the equilibrium, singing in the ears, an inclination to vomit, and kidney troubles. Although for a long time efforts have been made to eliminate or reduce the secondary effects, it has so far not been possible for a satisfactory solution to be found for these problems.

It has now been found that pantothenic acid, its functional derivatives such as its salts, esters and amides and such compounds as can be transformed in the living organism into pantothenic acid or which liberate this acid, are able in a surprisingly simple and effective manner to eliminate the secondary effects of the antibiotics produced from species of Streptomyces, so that in this way possibilities of new therapeutic uses are provided in these fields. Examples of pantothenic acid compounds of the kind mentioned before are pantothenic acid, its salts, pantothenal, pantothenic acid lactone, pantothenol, pantothenic acid amides and esters of pantothenic acid, in which the hydroxyl group of pantothenic acid is esterified with an acid, for example phosphoric acid, acetic acid or phthalic acid, or the carboxyl group of pantothenic acid is esterified with an alcohol, for example a monovalent lower alcohol or inositol.

The present invention provides a process for the production of therapeutically active products, wherein an antibiotic produced from a species of Streptomyces is reacted to form a chemical compound with pantothenic acid, a functional derivative of this acid or a compound which in the living organism can be transformed into pantothenic acid or which can liberate this acid.

The process of the invention is carried out by converting the basic antibiotic with a pantothenic acid component of the desired kind into a medicine which can be dispensed in a homogeneous form, such as a powder, a salve, an ointment, a suspension or a solution which can be injected, which preparations contain the new compound and are dispensed in this form to the patients.

According to the preferred form of the present invention, which has proved to be particularly valuable from a therapeutic point of view, a compound of the pantothenic acid series which is able to form a salt is reacted with the basic antibiotic to form the pantothenic acid salt of the antibiotic and the resulting material is used in this form as a medicine. The pantothenic acid salts of the said basic antibiotics, such as those of streptomycin, dihydrostreptomycin, neomycin and viomycin, are novel highly effective products with very low toxicity, and represent a valuable addition to the antibiotic medicines which are already in existence.

Preferably the pantothenic acid salts are produced from the basic antibiotic and the compound of the pantothenic acid series by reacting a salt of the basic antibiotic with a salt of the compound of the pantothenic acid series, the salt-forming components in such a case being so chosen that the basic antibiotic combines with the pantothenic acid to form the pantothenic acid salt of the antibiotic. For example, the sulphate of streptomycin or of dihydrostreptomycin can without difficulty be reacted with the calcium salt of pantothenic acid in aqueous solution to form the pantothenic acid salt of streptomycin or dihydrostreptomycin.

As regards the proportions in which the basic antibiotic and the compound of the pantothenic acid series are used or are chemically reacted with one another, the following should be stated:

Streptomycin calculated as base has a molecular weight of 581.6 and one mol of streptomycin is capable of combining with 3 mols of a monobasic acid such as pantothenic acid. This means that 581.6 parts of streptomycin are capable of combining with up to 657 parts of pantothenic acid with the formation of pantothenic acid salts of streptomycin. Tests with animals and human beings have shown that substantially smaller amounts of pantothenic acid than this are able to eliminate the toxic properties of streptomycin or to reduce them to an extent which allows for it to be used in practice. For streptomycin sulphate, the $DL_{50}$ is about 18 mg. per 20 g. of mouse body weight, that is to say, with this dose 50% of the test animals die. If a compound formed from 18 mg. of streptomycin sulphate and 4 mg. of pantothenic acid (in the form of the calcium salt) is used instead of 18 mg. of streptomycin sulphate, only 35-40% of the test animals die. If 6 mg. of pantothenic acid are added, the percentage of animals which die is reduced to about 25%, and this percentage is reduced to about 14% if 8 mg. of pantothenic acid are added and to less than 5% if 12 mg. of pantothenic acid are added. In general, therefore, it is sufficient if about 6 parts of pantothenic acid are added to 10 parts of streptomycin sulphate, although the invention is obviously not to be restricted to the use of this ratio.

As regards streptomycin sulphate, with slow intravenous injection (7.4 mm.³/minute) of a solution of 50 mg. of streptomycin sulfate (calculated on streptomycin base) per cc., the lethal dose for a rat is 23.66 mg. of streptomycin base (death by stopping respiration). With the addition of 20% of pantothenic acid (calculated on free streptomycin base), the lethal dose under the same conditions is 45.8 mg., i.e. the lethal dose is increased to about twice the amount by the addition of 20% of pantothenic acid.

The toxic properties of dihydrostreptomycin per se are lower than those of streptomycin, and a detoxication which is sufficient in practice is obtained if even smaller amounts of pantothenic acid are added, for example 6 g. of pantothenic acid to about 30-40 g. of dihydrostreptomycin sulphate.

With neomycin and viomycin, additions of about 3 g. of pantothenic acid to 15 g. of neomycin, or to 25 g. of viomycin, are sufficient.

The pantothenic acid salts of the basic antibiotics can be prepared in the form of simple or mixed salts and can be worked up to form medicines.

The advantageous effects which can be obtained by the use of the novel products of the present invention are apparent from the following data:

(1) The bacteriostatic action of the basic antibiotics is not reduced by the addition of the pantothenic acid component. This was established by tests in vitro, on incubated hens' eggs, white mice, guinea-pigs and rabbits. The experiments in all cases led to the same result.

(2) The lowering of the toxicity was checked by an animal test on a white mouse and showed the already mentioned strong lowering of the toxic properties. By way of amplification, it is pointed out that the dose which is lethal for 50% of the test animals ($DL_{50}$) is 70 mg. per 20 g. of mouse body weight with the pantothenic acid streptomycin, as compared with 18 mg. per 20 g. of mouse body weight with streptomycin sulphate. The animal tests were confirmed by the clinical results.

(3) Experiments for suppressing functional damage of balance and lowering of hearing power, were carried out, inter alia, on a cat. The period of treatment was 20 to 40 days. Whereas streptomycin and dihydrostreptomycin produced derangement from the fifteenth day, and the derangement generally existed in a serious form between the 30th and 35th day, no neurological disturbances or other symptoms of secondary effects occurred in any case when chemical compounds in accordance with the invention were used until the end of the test period. The toxicity diagrams specific for streptomycin and dihydrostreptomycin could also be suppressed in connection with rats and guinea-pigs. The results of the animal experiments could in the meantime be substantially confirmed in clinical tests on human beings.

Preparations which also contain other components, such as penicillin, procaine-penicillin or oxyprocaine-penicillin, in addition to streptomycin and pantothenic acid, are preferably prepared by initially preparing the pantothenic acid salt of the streptomycin component and then combining the salt which is obtained with the other component.

If salts, esters or amides of pantothenic acid or other of the aforementioned components of the pantothenic acid series are used as components in the manufacture of the novel products, it is necessary to use for the formation of the pantothenic acid component such starting substances as are not able to develop any effects which are injurious to the human or animal body when the pantothenic acid component is split off in the animal or human body.

The following examples further illustrate the invention.

*Example 1*

A solution of 14.56 g. of streptomycin sulphate in 30 cc. of water is mixed with an aqueous solution of 14.22 g. of calcium pantothenate. The clear reaction solution is left overnight in a refrigerator, the solution is filtered off from the calcium sulphate formed and the clear filtrate is concentrated by evaporation in vacuo at 0° C. Streptomycin pantothenate is obtained in a practically quantitative yield as a white crystalline mass, which is very soluble in water. The new salt decomposes between 130 and 140° C.

*Example 2*

The procedure is as in Example 1, but 14.6 g. of dihydrostreptomycin sulphate and 14.22 g. of calcium pantothenate are used as starting materials. The yield is about 86% of the theoretical. The salt decomposes between 130 and 140° C. It is very soluble in water.

*Example 3*

2.5 cc. of water are added to an intimate mixture of those amounts of streptomycin sulphate and dihydrostreptomycin sulphate which each correspond to 0.5 g. of streptomycin and dihydrostreptomycin base, and 0.25 g. of calcium pantothenate, and the mixture is thoroughly agitated for a certain time, after which the reaction is complete.

*Example 4*

70 mg. of penicillin-G-sodium, 400 mg. of procaine penicillin, an amount of dihydrostreptomycin sulphate corresponding to 500 mg. of dihydrostreptomycin base and 200 mg. of calcium pantothenate are intimately mixed and stirred with 2.5 cc. of water. The reaction of the dihydrostreptomycin sulphate with the calcium pantothenate is complete after thorough agitation.

*Example 5*

400 mg. of oxyprocaine pencillin, 1.3 g. of dihydrostreptomycin sulphate and 500 mg. of calcium pantothenate are thoroughly mixed and then 3 cc. of water are added. The suspension is shaken for some time, after which the reaction of the dihydrostreptomycin sulphate with the calcium pantothenate is complete.

*Example 6*

12.8 g. of streptomycin sulphate are mixed with 12.6 g. of sodium panthothenate in a sterile container by mechanical stirring, the humidity of the ambient air not exceeding 80%. The resulting product is not appreciably hygroscopic. This is surprising, because both starting components are very hygroscopic. Probably a reaction of the starting components to form a new salt is produced by the mechanical trituration.

*Example 7*

A concentrated aqueous solution of the sulphate of the neomycin complex is slowly mixed while stirring with a concentrated aqueous solution of calcium pantothenate until calcium sulphate is no longer precipitated. The mixture is left to stand overnight in the refrigerator. The calcium sulphate is then filtered off and the water is vaporised under reduced pressure at a low temperature. The pantothenic acid salt of the neomycin complex which is obtained in this manner is in the form of a white crystalline mass which is very soluble in water.

*Example 8*

The procedure is basically the same as in Example 1, but viomycin sulphate and calcium pantothenate are used as starting materials. In this way, viomycin pantothenate is obtained as a crystalline mass which is very readily soluble in water.

What we claim is:

1. A compound selected from the group consisting of streptomycin pantothenate, dihydrostreptomycin pantothenate, neomycin pantothenate and viomycin pantothenate.
2. Streptomycin pantothenate.
3. Dihydrostreptomycin pantothenate.
4. Neomycin pantothenate.
5. Viomycin pantothenate.

References Cited in the file of this patent

UNITED STATES PATENTS

| | | |
|---|---|---|
| 2,583,534 | Mast | Jan. 29, 1952 |
| 2,669,562 | Wilson et al. | Feb. 16, 1954 |

OTHER REFERENCES

Chemical Abstracts, vol. 42, 5955, 1948.
Chemical Abstracts, vol. 43, 6275, 1949.
Chemical Abstracts, vol. 44, 6912, 1950.
Stern: Arch. Biochem., October 1950, vol. 28, No. 3, pp. 364–370.
Lichstein et al.: Proc. Soc. Exptl. Biol. and Med., vol. 77, pp. 459–61, 1951.
A Review of the Clinical Uses of Aureomycin, publ. 1951 by Lederle, page 12.